United States Patent [19]

Goldberg et al.

[11] Patent Number: 5,667,051
[45] Date of Patent: Sep. 16, 1997

[54] HYDRAULIC CONTROL AND LUBRICATION SYSTEM WITH COMPRESSED AIR PRE-HEAT CIRCUIT FOR RAPID RESPONSE AT LOW AMBIENT TEMPERATURES

[75] Inventors: Gary L. Goldberg, San Diego; Paul E. Hilgeman, Santee; James V. Rector, San Diego; Malcolm J. McArthur, Escondido; David E. Jeorling, Huntington Beach; Charles H. Dutart, LaJolla; Mahendra P. Desai, San Diego, all of Calif.

[73] Assignee: Sundstrand Corporation, Rockford, Ill.

[21] Appl. No.: 397,703

[22] Filed: Mar. 1, 1995

[51] Int. Cl.⁶ .................. F16D 25/12; F16D 25/10
[52] U.S. Cl. .............................. 192/85 R; 60/329
[58] Field of Search .............. 60/320, 329, 690; 137/340; 92/144, 181 P; 165/39; 192/85 AA, 85 R, 106 F

[56] References Cited

U.S. PATENT DOCUMENTS

| | | | |
|---|---|---|---|
| 3,162,063 | 12/1964 | Konrad | 192/85 AA X |
| 3,253,409 | 5/1966 | Kellogg et al. | 60/52 |
| 3,362,481 | 1/1968 | Steinhagen | 192/85 AA |
| 3,602,347 | 8/1971 | Yamaguchi et al. | 192/85 AA X |
| 4,261,455 | 4/1981 | Uitenbroek et al. | 192/106 F |
| 4,542,722 | 9/1985 | Reynolds | 123/179 E |
| 4,657,041 | 4/1987 | Mitsui | 137/116.3 |
| 5,004,084 | 4/1991 | Mehr-Ayin et al. | 192/0.033 |
| 5,174,109 | 12/1992 | Lampe | 60/39.142 |
| 5,235,803 | 8/1993 | Rodgers | 60/39.07 |
| 5,253,470 | 10/1993 | Newton | 60/39.08 |

Primary Examiner—Rodney H. Bonck
Attorney, Agent, or Firm—Lawrence E. Crowe

[57] ABSTRACT

In a power transmission or generation apparatus having a source of heated pressurized air, the problem of achieving rapid controlled engagement of a hydraulically actuated clutch at low ambient temperatures is solved by utilizing a portion of that heated pressurized air for heating only that small control volume of hydraulic fluid within a clutch control circuit needed to achieve rapid actuation and stable control of the hydraulic clutch. Our invention is thus particularly applicable in a power transmission or generation apparatus having a gas turbine engine, or a turbocharged piston engine as the prime mover. With gas turbine engine powered units, our invention contemplates the use of compressor discharge air, rather than exhaust products for heating the hydraulic fluid. Similarly, for piston engines our invention contemplates the use of turbocharger discharge air rather than exhaust products. In one embodiment a clutch and a control circuit are provided in which the fluid volume of the control circuit is minimized, and fluid removal features are provided to effectively drain all residual fluid from a portion of the control circuit following disengagement of the clutch. On subsequent start-up from cold ambient temperatures, the drained portion of the control circuit is filled with pre-heated fluid prior to engagement of the clutch thus eliminating problems of slow response and controllability encountered due to cold viscous fluid in prior clutch control circuits.

13 Claims, 2 Drawing Sheets

HYDRAULIC CONTROL AND LUBRICATION SYSTEM WITH COMPRESSED AIR PRE-HEAT CIRCUIT FOR RAPID RESPONSE AT LOW AMBIENT TEMPERATURES

TECHNICAL FIELD

This invention relates to hydraulic systems generally, and more particularly to apparatus including a hydraulic system which must provide rapid actuation and stable operation of a pressure actuated device such as a hydraulicly actuated clutch at low temperatures.

BACKGROUND

Emergency power units which supply electrical or hydraulic power for critical flight control systems on an aircraft, following a loss of main engine power, must come on line and begin producing power virtually instantaneously when they are needed. The same is true for power transmission or generation apparatus used in stationary emergency power generators which supply electricity to a computer or a hospital, for instance, in the event of a power outage in a municipal power grid. These systems must provide power virtually instantaneously despite the fact that they may have been sitting idle for extended periods of time at ambient temperatures of $-20°$ F. or below.

Such emergency power units often utilize a hydraulic clutch to couple an engine or other prime mover to a generator, a pump, or some other driven device. The clutch allows the driven device to be de-coupled from the engine during startup to reduce the load on the engine start system. The clutch also allows the engine to be rapidly de-coupled from the driven device for safety or other reasons. In some instances the clutch is further required to provide a controlled amount of slip to achieve a smooth engagement, or to compensate for rapid fluctuations in the load imposed on the engine by the driven device.

The hydraulic clutches in such emergency power units must engage controllably, responsively and reliably in order to perform their required functions. To achieve such performance from the clutch, however, it is necessary that the hydraulic system supplying fluid to the clutch be properly designed to allow rapid controlled response under adverse conditions.

A typical hydraulic system in these applications includes a pump or other source of pressurized fluid, a low pressure reservoir, a source of control signals, a fluid actuated device, such as a hydraulic clutch, and a fluid control valve. These components are connected to form a fluid circuit in which the valve receives a flow of pressurized fluid from the pump. The valve converts a portion of that flow of pressurized fluid into control flow or pressure that is then supplied to the fluid actuated device in response to control signals received from the source or control signals. The remaining small leakage portion of the flow of pressurized fluid passes through the valve and returns to the low pressure reservoir. Although the clutch control circuit can be a separate dedicated hydraulic system, it is often advantageous to combine the control circuit with other hydraulic circuits used for lubrication or cooling of parts of the overall apparatus in which the clutch control system operates. By combining the hydraulic circuits in this manner, a single pump and reservoir system may serve several hydraulic circuit loops, thereby reducing the complexity and cost of the hydraulic system.

The control circuits of such hydraulic systems must be capable of responding quickly when they are needed, despite the fact that the hydraulic fluid may have become highly viscous during a prolonged period of inoperation coupled with exposure to extremely cold ambient temperatures. Such highly viscous fluid does not flow readily, however, thus making it difficult to achieve rapid response. Furthermore, it is often difficult to provide a control valve that is capable of achieving and maintaining stable control at fluid temperatures which are significantly different than the normal operating temperature of the fluid.

To facilitate rapid response and to ensure stable control on startup, hydraulic systems have sometimes included means for heating the fluid prior to engaging the clutch. In some such systems, an auxiliary heater is utilized to warm the fluid in the reservoir. To achieve instantaneous actuation and stability with this type of system it is generally necessary that the heating device be operated continuously to maintain the fluid within a temperature range known to provide acceptable performance. The wasted energy costs for this type of system can be substantial if the system must be maintained in a ready state while standing idle for extended periods of time.

Alternatively, a heating device that is capable of rapidly raising the temperature of the fluid to operating temperature "on demand" just prior to startup can be employed, with actual engagement of the clutch being delayed following an engagement command until the fluid has reached operating temperature. Obviously, for an emergency power unit such a delay is undesirable. In an aircraft emergency power unit, for instance, it is sometimes a requirement that the unit be fully operational and producing controlled power within 30 seconds of receiving a start command.

While any delay is undesirable, the "on-demand" approach is often preferred for practical reasons such as reducing the operating cost or complexity of the hydraulic system. In addition, and particularly where the prime mover is an engine, various waste heat sources such as frictional and dynamic pressure losses in the hydraulic circuit, exhaust gases, or an engine cooling circuit are often available for on demand heating of the fluid in the hydraulic circuit without the need for external energy input. A temperature responsive valve is often utilized in this type of system to provide heat only during the "on demand" heating period.

Although these "on-demand" heating approaches are acceptable in some instances, they are not entirely satisfactory for emergency power units driven by air cooled gas turbine engines. In these engines, there is no separate liquid or air cooling circuit. Cooling is provided by the air flowing through the engine from the inlet to the exhaust. The exhaust gases are typically very hot, i.e. over $1000°$ F., and therefore present substantial challenges in designing the ducting, control valves, and heat exchangers which would be required to utilize this heat. Specifically, the extremely high temperature of the exhaust gas rules out the use of lightweight materials such as aluminum for components exposed to the exhaust gases. The additional weight penalty incurred thus generally precludes the use of exhaust gases for cooling in aircraft mounted power units.

Because of these problems, many prior gas turbine engine driven power units have resorted to simply allowing the fluid in the hydraulic system to circulate and be warmed by frictional and dynamic pressure losses in the circuit for some period of time prior to carrying out a command to engage the clutch. For start-up at temperatures in the range of $-20°$ F. and below, this has resulted in unacceptable delays in bringing the power transmission or generation unit on line. This is particularly true where there is a shared hydraulic system providing fluid to other control, lubrication, or cooling circuits in addition to the clutch control circuit, and all of the fluid circulating in the hydraulic system must be warmed to a temperature at which rapid actuation and stable control of the clutch can be achieved.

It is an object of our invention, therefore, to provide an improved hydraulic clutch. It is also an object of our invention to provide an improved hydraulic system that is capable of effectively and efficiently heating at least a portion of the fluid in the clutch control loop to a temperature at which rapid actuation and stable control can be achieved in a significantly shorter period of time than can be accomplished in prior hydraulic systems using waste heat to warm a fluid in an on-demand heating approach. Additional objects of our invention include providing:

1. a gas turbine engine powered auxiliary power unit (APU) capable of providing a controlled power output in less than 30 seconds after receiving a start command when the APU has been exposed for an extended period of time to ambient temperatures of −20° F.;
2. a hydraulic control system capable of engaging and providing stable control of a hydraulic clutch in less than 30 seconds after prolonged exposure to ambient temperatures of −20° F.;
3. an on-demand heating system which is applicable to hydraulic systems having either single or multiple branches and capable of heating at least a portion of the fluid in the system to a temperature at which a control circuit of the hydraulic system can engage and achieve stable control of a fluid actuated device, such as a hydraulic clutch, in less than 30 seconds after prolonged exposure to ambient temperatures of −20° F.; and
4. a straightforward and inexpensive arrangement for producing a hydraulic system meeting the above stated objects.

SUMMARY

In a power transmission or generation apparatus having a source of heated pressurized air, our invention achieves the objects and overcomes the problems described above by utilizing a portion of that heated pressurized air for heating only that small control volume of hydraulic fluid within the control circuit needed to achieve rapid actuation and stable control of a fluid device such as a hydraulic clutch. Our invention is thus particularly applicable in a power transmission or generation apparatus having a gas turbine engine, or a turbocharged piston engine as the prime mover. With gas turbine engine powered units, our invention contemplates the use of compressor discharge air, rather than exhaust products for heating the hydraulic fluid. Similarly, for piston engines our invention contemplates the use of turbocharger discharge air rather than exhaust products.

By utilizing pressurized air from the inlet of the engines rather than exhaust products, the problems of dealing with extremely high exhaust temperatures are avoided. The outlet temperature of the hot pressurized air in a single stage compressor will typically be less than half of the exhaust gas temperature, i.e 400° to 500° F. for compressor discharge air vs. 1000° F. plus for exhaust gases, and well within the structural capabilities of materials such as aluminum which might desirably be used for ducting, valves, or heat exchangers in the on-demand heater circuit. The discharge pressure from either the compressor of a gas turbine engine or from a turbocharger is typically higher than the pressure which is available in an exhaust gas stream, i.e. 50 to 80 PSIG in a single stage compressor, for example, as compared to just above atmospheric pressure for a typical exhaust gas stream. This higher pressure allows ducting and other components in the on-demand heater circuit of our invention to be considerably smaller, lighter, less complex, and therefore less expensive than prior heating approaches utilizing exhaust gases. The combination of higher pressure and lower temperature thus greatly facilitates the design and fabrication of the heating circuit.

Because we heat only a small portion of the fluid in the immediate vicinity of the control elements in the hydraulic system of our invention, our system is able to heat that small volume of fluid to a temperature at which engagement and stable control can be achieved significantly faster than those prior systems which heated all of the fluid in the hydraulic circuit by heating the fluid reservoir, or by circulating the fluid and allowing it to be heated by friction or dynamic pressure losses. One embodiment of our invention allows a hydraulic clutch coupling a gas turbine engine to a gearbox in an aircraft APU to be engaged less than 30 seconds after receiving a start command, even when the APU has been cold-soaked and stabilized at −20° F. prior to receiving the start command. The localized heating of our invention also allows the invention to be utilized with advantage in hydraulic systems having either single or multiple control loops.

According to one aspect of our invention, in an apparatus having a prime mover including means for providing both a supply of heated compressed air, and shaft power selectively couplable through a hydraulicly actuated clutch to a driven device, our invention provides a clutch control system capable of achieving rapid actuation and stable control of the clutch at low ambient temperatures. That clutch control system includes clutch actuator means operably connected to the hydraulically actuated clutch in a manner to selectively apply fluid pressure to the clutch for actuating the clutch in a controlled manner, with the clutch actuator means defining a control volume of fluid therein. The clutch actuator means further includes heat exchange means operably connected between the prime mover and the clutch actuator means in such a manner to direct a flow of the heated compressed air to the clutch actuator means for heating the control volume of fluid therein.

According to another aspect of our invention, the clutch actuator means includes a clutch control circuit having a pump, or other source of fluid pressure, connected sequentially in a series flow relationship via a heat exchanger and a control servo valve to the hydraulicly actuated clutch. The pump draws fluid from a reservoir, and the valve returns flow not used in engaging the clutch to the reservoir. The sum of the internal volume of the control valve plus a stroke volume of a clutch piston which causes the working elements of the clutch to engage defines a small control volume of fluid. The heat exchange means includes the heat exchanger and ducting means for operably coupling the heat exchanger to the prime mover in a manner to provide a flow of heated compressed air from the prime mover to and through the heat exchanger. The heat exchanger and ducting means are sized to provide rapid heating of only the small volume of fluid defined by the control valve and the stroke volume of the clutch piston.

In a highly preferred embodiment of our invention, the internal fluid control volume of the clutch control circuit is minimized and the internal volume of the heat exchanger is exactly matched to that fluid control volume. Fluid removal means are provided for draining all fluid out of the clutch control circuit downstream from the heat exchanger each time the clutch is disengaged. On start-up at cold temperatures there is thus no cold viscous fluid in the clutch control system to impede actuation or cause control stability problems. When the control servo valve is actuated to engage the clutch, the entire control circuit is filled with the pre-heated control volume of fluid from the heat exchanger.

According to yet another aspect of our invention, the apparatus further includes a pressurized air control valve operably disposed in the ducting means between the prime mover and the heat exchanger in a manner allowing the flow of hot pressurized air to be selectively turned on or off in response to control signals acting on the air control valve. The apparatus also includes temperature sensing and control means operably connected to sense the temperature of a fluid within the control volume of fluid, and to provide control signals to cause the air control valve to turn on or off at certain predetermined control temperatures.

According to a further aspect of our invention, the pump supplies fluid to a second fluid circuit in a parallel flow relationship with respect to the clutch actuator circuit. The second fluid circuit includes a pressure control means in the form of pressure control valves and an orifice operable to maintain a low pressure portion of the second fluid circuit at a second pressure lower than the pressure of the clutch actuator circuit. This pressure control means is sized to provide a preselected second pressure at normal operating temperatures of the hydraulic circuit. The pressure control means also includes an orifice disposed in a series flow relationship with the pressure control means in such a manner that when the fluid viscosity increases at low temperatures, the orifice provides additional pressure drop in series with the control means to raise the pressure in the clutch actuator circuit, thereby providing additional pressure from the pump to help force the pre-heated fluid into the clutch, and to help force cold viscous fluid into the heat exchanger to replace the pre-heated fluid forced into the clutch.

These and other aspects and advantages of our invention will be apparent to those skilled in the art upon consideration of the following drawing figures and detailed description of various exemplary embodiments of our invention.

DETAILED DESCRIPTION OF PREFERRED EMBODIMENT

Figure 1:
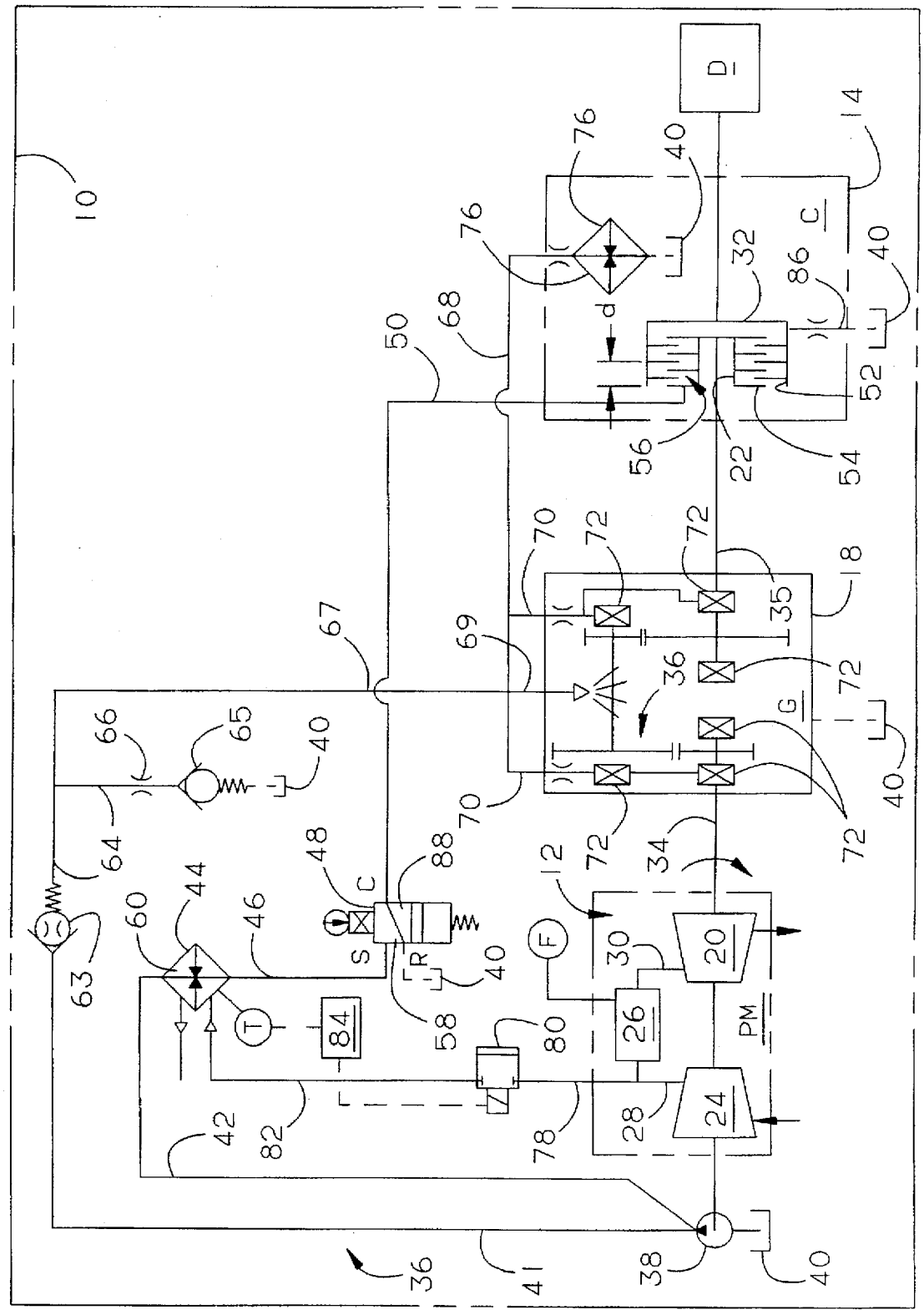
FIG. 1 is a schematic representation of an exemplary embodiment of an apparatus according to our invention in the form of a power plant having a driven device such as an electrical generator or a pump selectively couplable through a hydraulic clutch to a gearbox driven by a gas turbine engine.

FIG. 1 depicts an exemplary embodiment of our invention in the form of a power plant 10 having a prime mover PM in the form of a gas turbine engine 12 driving a gearbox 18 which is selectively couplable via a hydraulicly actuated clutch 14 to drive a driven device D in the form of an electrical generator or a pump. The gas turbine engine 12 includes a turbine 20 providing output shaft power to an input shaft 34 of the gearbox 18. The gas turbine engine also includes a compressor 24 driven by the turbine 20 to supply compressed air to a combustor 26 via a compressed air plenum chamber indicated schematically as conduit 28 in the Drawing. In the combustor 26, the compressed air is mixed with fuel from a fuel source F and combusted to provide a flow of hot gases of combustion, via a nozzle indicated schematically as conduit 30, to drive the turbine 26.

An output shaft 35 of the gearbox 18 is connected to drive a driving element 22 of the clutch 14. The clutch 14 also includes a driven element 32 which is operably coupled to the driven device D such that with the gas turbine engine 12 running, and with the driving and driven elements 22, 32 of the clutch 14 engaged, the engine 12 will drive the driven device D via a geartrain, indicated schematically at 36 within the gearbox 18, operably coupling the input 34 of the gearbox 18 to the output shaft 35 connected to the driving element 22 of the clutch 14.

The power plant 10 also includes a hydraulic system indicated generally as 36. The hydraulic system 36 includes a single pump 38 driven by the engine 12 and drawing fluid from a reservoir 40. The pump supplies pressurized fluid in a parallel flow circuit relationship to a clutch actuation circuit, and to a lubrication and cooling circuit of the hydraulic system 36.

The clutch actuation circuit includes, in a sequential series flow relationship, conduit 42 extending from the pump to a heat exchanger 44; the heat exchanger 44; conduit 46 extending from the heat exchanger to a supply port S of a fluid control servo valve 48; the valve 48; and conduit 50 extending from a control port C of the valve 48 to a cylinder 52 of the clutch 14. The cylinder 52 houses a movable wall in the form of a clutch control piston 54 operably connected within the clutch 14 to cause engagement of the driving and driven elements 22, 32 of the clutch 14 when the piston 54 is moved a piston stroke distance "d" by pressurized fluid supplied to the cylinder 52 and applied to the piston 54. The volume swept by the piston 54 in travelling the piston stroke distance d within the cylinder 52 defines a stroke volume 56 of fluid. An internal fluid volume 58 of the control valve 48 is defined by that volume within the valve 48 which is filled with fluid during operation of the valve 48. The fluid circuits within the heat exchanger 44 of the exemplary embodiment are specifically sized to hold only the sum 60 of the stroke volume 56 and the internal volume 58 of the fluid control valve 48. This combined sum 60 of the two fluid volumes 56, 58 is the control volume 60 in this exemplary embodiment of our invention.

As illustrated schematically in FIG. 1, the control valve 48 has two positions, but those skilled in the art will recognize that an actual servo control valve 48 will modulate flow or pressure between the two positions specifically described herein. In the position illustrated, it can be seen that the control valve 48 is in a "disengage" position. In the "disengage" position, the valve 48 blocks fluid flow from the pump 38 to the clutch 14, and allows fluid from the clutch 14 to return to the reservoir 40 via a return port R of the valve 48. Conversely, when the valve 48 is in the "engage" position, the valve 48 allows pressurized fluid from the pump 38 to pass from the supply S port to the control port C through the valve 48 and into the cylinder 52, while blocking flow from the return port R to the reservoir 40.

The lubrication and cooling circuit includes, in a sequential series flow relationship, conduit 41 extending from the pump 38 to a pressure reducing valve 63; the pressure reducing valve 63; conduit 64 extending from the pressure reducing valve 63 to a low pressure relief valve 65; and the low pressure relief valve 65, which dumps to the common reservoir 40. The lubrication and cooling circuit also includes a flow restricting orifice 66 downstream from the pressure reducing valve 63 and disposed in a series flow relationship to the low pressure relief valve 40. The lubrication and cooling circuit also includes a branching conduit 67 which joins conduit 64 between the orifice 66 and the pressure reducing valve 63. Conduit 67 branches into conduits 69 and 70 which feed fluid respectively to a lubricant spray nozzle 74 and bearings 72 within the gearbox 18. The fluid used for lubrication is collected in a sump area of the gearbox 18 and returned to the common reservoir 40. Conduit 67 also supplies a flow of fluid via conduit 68 to a cooling circuit 76 within the clutch 14 that dumps the fluid used for cooling the clutch 14 back to the common reservoir 40.

The power plant 10 of the exemplary embodiment also includes heat exchange means in the form of sequentially connected conduit 78, compressor discharge valve 80, and conduit 82 which operably connect the plenum 28 of the engine 12 to the heat exchanger 44 so that a flow of heated compressed air from the compressor 24 can be directed to the heat exchanger 44 of the clutch actuator means for heating the control volume 60 of fluid within the heat exchanger 44. The compressor discharge valve 80 allows the flow of heated compressed air to be shut off when heating of the control volume 60 is not required. The heat exchanger 44 and the plenum 28 are also considered to form part of the heat exchange means in this embodiment of our invention.

The heat exchange means of power plant 10 further includes sensing and control means in the form of a controller 84 and a temperature sensor T disposed to sense the temperature of the control volume of fluid 60 within the heat exchanger 44. The sensor T sends a signal proportional to temperature of the fluid in the control volume 60 to the controller 84 which commands the compressor discharge valve 80 to shut off the flow of heated pressurized air at a predetermined temperature of the control volume of fluid 60.

At normal ambient temperatures in the range of about 30° F. and above, when a start command is received by the power plant 10 of the exemplary embodiment, a master controller (not shown) of the power plant 10 will command an engine start system (not shown) to spin up the engine 12 and initiate a start sequence. The engine will light off and accelerate toward operating speed within a few seconds of receiving the start command. For a small gas turbine engine of the type used in aircraft auxiliary power units, it is desirable to allow the engine to accelerate to approximately 100% of normal operating speed prior to engaging the hydraulic clutch. A typical small gas turbine engine of this type will generally require about 30 seconds to light-off and accelerate to 100% speed. The pump 38 will begin to produce pressure in the hydraulic circuit as the engine 12 comes up to speed. With the fluid already at the normal ambient temperature when the start command is received, the master controller will shift the control valve 48 to the "engage" position as soon as the engine 12 reaches 100% speed, thereby allowing pressurized fluid to pass through the valve 48 into the cylinder 52 where it acts on the clutch piston 54 to engage the clutch 14 to allow the engine 12 to drive the driven device D. Engagement of the clutch 14 at normal ambient temperatures will thus take place within a few seconds after the engine 12 reaches full operating speed, and within about 30 seconds of the master controller receiving a start command.

At normal ambient temperatures, therefore, the valve 48 may be actuated to engage the clutch 14 and bring the power plant 10 on line as soon as the engine reaches operating speed. The fluid will readily flow through the hydraulic system, and the viscosity will be such that the fluid control means 86 within the valve 48 will have no problem achieving stable control of the clutch 14. There is no need under such circumstances to open the compressor discharge valve 80 to provide heating of the control volume 60. In the exemplary power plant 10 operating at such conditions, it is contemplated that the pump 38 might be sized to produce an outlet pressure of about 250 PSIG. Because there is only a very small flow of fluid in the clutch actuation circuit all components of that circuit would be exposed to the full outlet pressure of 250 PSIG. At normal ambient temperatures, such a pressure is entirely adequate to force fluid through the clutch actuation circuit and into the clutch 14. Because it is desirable to operate the lubrication and control circuit at a lower pressure to avoid excessive dynamic heating of the lubricant, it is contemplated that the pressure reducing valve 63 and the low pressure relief valve 65 would operate to maintain pressure of about 40 PSIG in conduit 64, and hence also throughout the various lateral circuits branching out from conduit 67 which is connected to conduit 64. Specifically it is contemplated that the pressure reducing valve 63 and the low pressure relief valve 65 would operate as series pressure drops, with the pressure reducing valve 63 reducing the fluid pressure by approximately 210 PSI, and that the low pressure relief valve 65 be sized to allow a continuous flow of fluid through the relief valve at a controlled pressure drop of 40 PSI to the reservoir 40. The orifice 66 is configured to provide minimal resistance to flow, in comparison to the low pressure relief valve 65, at normal ambient temperatures. Thus at such normal operating temperatures, the orifice 66 does not significantly affect the flow of fluid through the cooling and lubrication circuit.

When the power plant is required to start after a cold-soak at a low ambient temperature of −20° F., however, the controller 84 will command the compressor discharge valve 80 to open at some point during the engine start and acceleration sequence. Heated compressed air from the compressor 24 will be directed through the heat exchanger 44 to heat the control volume 60 of fluid to a temperature at which stable control can be achieved by the fluid control means 86 control valve 48. Because the control volume 60 is so small, i.e. only 4 cubic inches in one embodiment of our invention, the desired temperature will be reached in a few seconds, and the valve 48 may then be moved to the engage position to engage the clutch 14 almost as quickly as at normal operating temperatures.

When the valve 48 is opened to the engage position, the control volume 60 moves through the conduit 46 into the internal volume 56 of the fluid control valve 48. With the fluid heated, its viscosity is reduced to a point allowing the fluid to readily move through the various components of the actuator circuit into the clutch 14. Furthermore, because the warm control volume 60 fluid now fills the internal fluid volume 58 of the valve 48, the fluid control means 86 can readily achieve stable control of the clutch 14. At low ambient temperatures, therefore, our invention allows the clutch 14 to be engaged within a few seconds after the engine 12 reaches 100% operating speed. In one embodiment of our invention similar to that depicted in FIG. 1, successful engagement and stable control were demonstrated in engagement attempts made within 10 to 30 seconds after the engine reached 100% speed, using fluid pre-heated from −20° F. to about 30° F. prior to initiating engagement. Without the pre-heating feature of our invention, a similar power plant required that the fluid be circulated for about two minutes to warm the fluid to approximately 120° F. before successful engagement with stable control could be achieved.

At low fluid temperatures, the orifice 66 also comes into play. The increased fluid viscosity in the cooling and lubrication circuit will cause the orifice to provide significant pressure drop in comparison to the low pressure relief valve 65. Because the orifice 66 is in series with the low pressure relief valve 65, the orifice 66 will raise the operating pressure in both the clutch actuation and lubrication and cooling circuits above the normal operating pressure of the pump 38, without the need for changing the sizing or set points of either the pressure reducing valve 63, or the low pressure relief valve 65. This increase in pressure will help to drive the viscous fluid into the heat exchanger 44, as well as helping to move the control volume of fluid 60 from the heat exchanger 44 into the valve 48 and the cylinder 52 thereby facilitating rapid engagement of the clutch 14.

Figure 2:
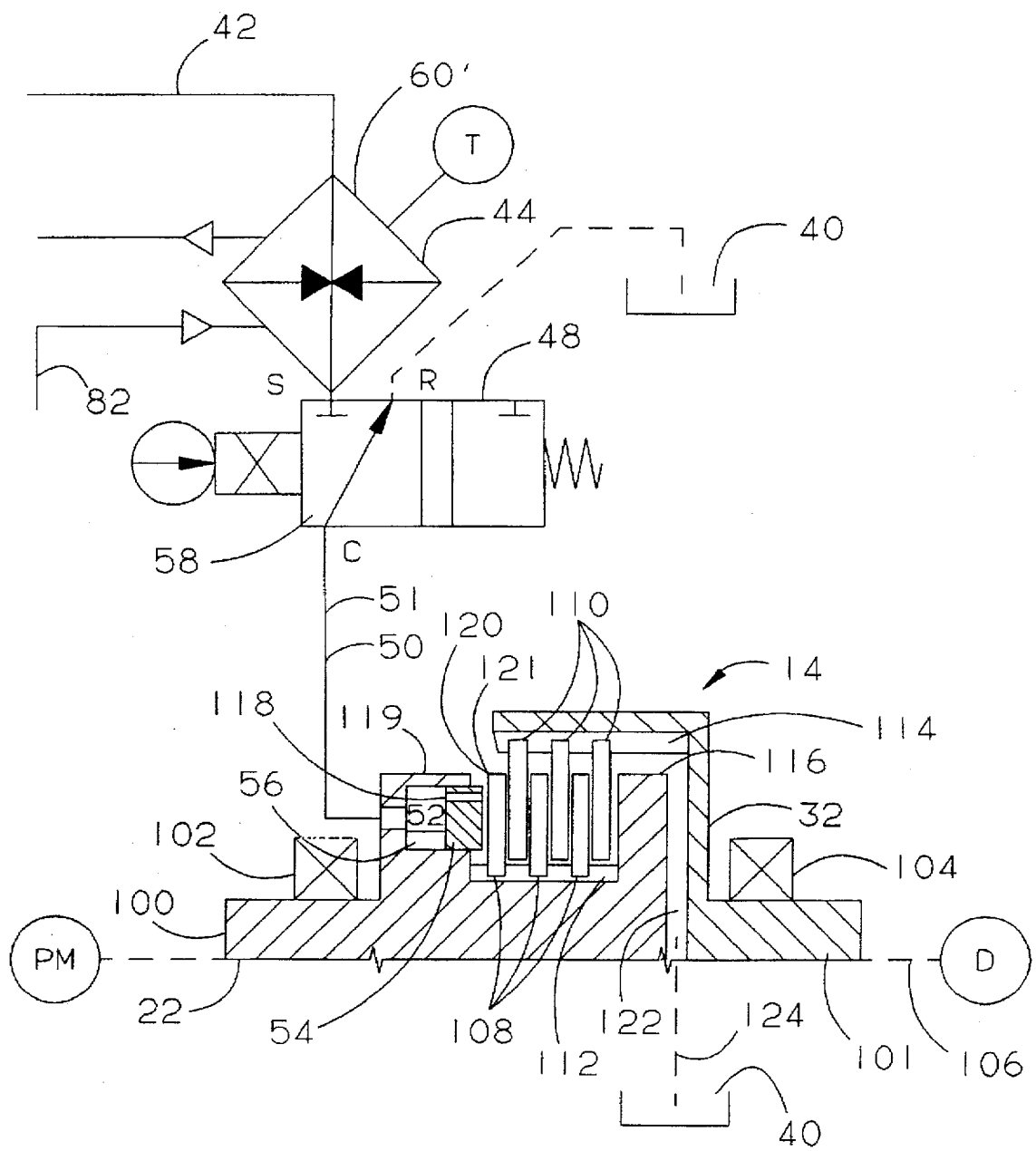
FIG. 2 is a schematic representation of a preferred embodiment of a hydraulic clutch and a clutch actuator circuit for the power plant of FIG. 1.

FIG. 2 illustrates a highly preferred embodiment of a clutch and control circuit according to our invention in which the fluid volume of the circuit is minimized, and means are provided for removing fluid from the circuit downstream of the heat exchanger 44 following disengagement of the clutch 14. According to this embodiment of our invention, the supply port S of the control valve 48 is connected directly to the heat exchanger 44 in a manner which essentially eliminates the conduit 46 connecting the control valve 48 and the heat exchanger 44 in the embodiment depicted in FIG. 1. With this arrangement, any fluid volume within the conduit 46 is thus eliminated from the clutch control circuit shown in FIG. 2. The heat exchanger 44 is sized to hold only a control volume 60' equal to the sum of the internal fluid volume 58 of the control valve 48, the stroke volume 56 of the clutch 14, and the internal conduit fluid volume 51, of any conduit 50 connecting the control port C of the control valve 48 to the cylinder 52 of the clutch 14.

The driving element 22 of the clutch 14 includes an input shaft 100 and an output shaft 101 journaled respectively in bearings 102, 104 for rotation about a common axis 106. The input shaft 100 is operatively connected to a prime mover, such as the engine 12 of FIG. 1, to receive power therefrom for rotating the input shaft 100 about the axis 106. The output shaft 101 is operatively coupled to a driven apparatus D, such as the gearbox 18 of FIG. 1, in such a manner that the output shaft 101 will drive the driven apparatus D when the output shaft 101 is rotated about the axis 106.

Operative connection between the input and output shafts 100, 101 is provided by a series of interleaved annular shaped drive plates 108 and driven plates 110. The drive plates 108 are attached to the input shaft 100 by a spline 112 in such a manner that they may slide axially along the spline 112, but are constrained to rotate with the input shaft 100. In similar fashion, the driven plates 110 are attached to the output shaft 101 by a spline 114 in such a manner that they may slide axially along the spline 104, but are constrained to rotate with the output shaft 101. The input shaft 100 further includes, at the right axial end thereof as depicted in FIG. 2, an integral flange 116, and at the left axial end thereof the piston 54 mounted to slide axially within the cylinder 52 which is defined by the input shaft 100. The interleaved drive and driven plates 108, 110 are sandwiched between the flange 116 and the piston 54, such that when fluid pressure is supplied to the cylinder 52, the piston 54 will move toward the right. As the piston 52 moves toward the right, the drive and driven plates 108, 110 are clamped tightly against one another and against the flange 116, thereby causing the clutch to engage and transmit torque from the prime mover PM to the driven apparatus D. When fluid pressure is released from the cylinder 54, a return spring (not shown) urges the piston 54 to move toward the left away from the flange 116, thereby unclamping the drive and driven plates 108, 110, and disengaging the prime mover from the driven apparatus D.

Fluid removal means for removing residual fluid from the clutch control circuit following disengagement of the clutch 14 are provided by a series of drain holes 118 which extend through the piston 54 at a radially outer edge 119 thereof. These drain holes 118 provide a channel for fluid communication between the cylinder 52 and an internal volume 122 of the clutch 14 at any time the clutch 14 is disengaged.

Specifically, the drain holes 118 are positioned radially in the piston 54 such that when the clutch 14 is engaged and the respective faying surfaces 120, 121 of the piston 54 and the adjacent clutch plate 108 are tightly clamped together, the faying surface 121 of the adjacent clutch plate 108 will block fluid flow through the drain holes 118. When the clutch 14 is disengaged, the return spring (not shown) of the clutch 14 will cause the piston 54 to move toward the left, thereby allowing the faying surfaces 120, 121 of the piston 54 and the adjacent clutch plate 108 to separate, unblocking the drain holes 118. Fluid from the clutch control circuit may then flow freely from the cylinder 52 and into the internal volume 122 of the clutch 14 via the drain holes 118 and the space 126 between the separated faying surfaces 120, 121 of the piston 54 and the adjacent clutch plate 108. The fluid entering the internal volume 122 of the clutch 14 is collected in a sump portion (not shown) of the clutch 14 and returned to the reservoir 40, as shown schematically at 124 of FIG. 2.

The drain holes 118 thus provide an alternative path, i.e. in addition to the path through the valve 48 return port R, for fluid to escape from the clutch control circuit downstream of the supply port S of the control valve 48 when the valve 48 is in the disengage position. On disengagement of the clutch, as the piston 54 is moved to the left by the return spring (not shown), fluid can be expressed from the cylinder 52 by either of two routes: via the drain holes 118 into the internal volume 122 of the clutch 14 and to the reservoir 40; or via conduit 50 and the return port R of valve 48 to the reservoir 40.

Placing the drain holes 118 near the radially outer edge 119 of the piston 54 provides an additional advantage with regard to fluid removal, however. The piston 54 and cylinder 52 rotate with the driving element 22 of the clutch 14. Fluid within the cylinder is thus slung outwards by centrifugal force as the driving element 22 rotates about the axis 106. This centrifugal force tends to pump fluid out of the cylinder 52 through the drain holes 118 when the clutch 14 is disengaged. This pumping action not only removes fluid already in the cylinder 52 at disengagement, but also creates a suction tending to draw any remaining fluid out of the internal volume 51 of the conduit 50, and the internal volume 58 of the control valve 48.

Thus, by virtue of placing the drain holes 118 near the radially outer edge 119 of the rotating piston 54, fluid removal means are provided for effectively and automatically draining substantially all fluid from the entire fluid volume of the clutch control circuit downstream from the control port C of the control valve 48 every time the clutch 14 is disengaged. On a subsequent start-up at cold temperatures, there is thus no cold viscous fluid in this portion of the clutch control circuit to retard movement of fluid into the cylinder 52, or to cause control stability problems within the control valve 48.

Furthermore, by connecting the heat exchanger 44 directly to the supply port S of the valve 48 and sizing the internal volume 60' of the heat exchanger 44 to match the control volume 60' of the clutch control circuit downstream from the heat exchanger 44, virtually instantaneous controlled engagement of the clutch 44 can be provided following engine startup even after prolonged exposure of the clutch control circuit to low ambient temperatures.

Operation of this embodiment of our invention is essentially the same as already described with regard to the embodiment of FIG. 1. However, on a cold start with this embodiment of our invention, the entire fluid volume of the clutch control circuit downstream of the heat exchanger 44, i.e. the control volume 60' will be heated by compressed air prior to opening the control valve 48. Since the entire fluid volume of the clutch control circuit downstream from the heat exchanger 44 was drained upon the previous disengagement of the clutch 14, moving the fluid valve 48 from the disengaged to the engaged position allows the pre-heated control volume 60' to flow readily from the heat exchanger 44 through the control valve 48 and conduit 50 into the cylinder 52, thus rapidly filling the clutch control circuit with pre-heated normal viscosity fluid. Resistance to flow is essentially zero since there is no fluid remaining within the valve 48, the conduit 50 or the cylinder 52 following the previous disengagement of the clutch 14. Actuation of the clutch 14 will thus be extremely rapid even at very cold temperatures because there is no cold viscous fluid left remaining inside the clutch control circuit, by virtue of the action of the drain holes 118 in the piston 54 following the previous shutdown.

From the foregoing description, those skilled in the art will readily recognize that our invention overcomes problems encountered in prior apparatus requiring rapid actuation and stable control of a hydraulicly actuated clutch at low ambient temperatures. Specifically, with the hydraulic system of our invention it is now possible to have an emergency power unit on line within about 30 seconds of a start command, even where the power plant has been cold-soaked to low abient temperatures such as –20° F. prior to attempting startup. Our invention thus eliminates the need for auxiliary heating systems with their associated operating costs, or the need to let the hydraulic circulate for unacceptable periods of time to warm up prior to attempting to engage the clutch.

Those skilled in the art will further recognize that, although we have described our invention herein with respect to several specific embodiments and applications thereof, many other embodiments and applications of our invention are possible within the scope of our invention as described in the appended claims. For example, the gas turbine engine 12 of the embodiments presented herein could be replaced with another type of prime mover, such as a turbocharged diesel engine. The hydraulic system of our invention can be utilized to advantage with hydraulic devices other than the hydraulically actuated clutch of the exemplary embodiment. Although the control valve 48 used in the exemplary embodiment was a servo type control valve, in other embodiments it may be preferable to utilize a simple on-off type valve to engage the clutch. The clutch actuation circuit of the exemplary embodiment was described as a closed end system, with virtually no fluid flowing therein. It is feasible to provide control flow means as shown at 88 of the drawing to allow a small amount of flow, in relation to the flow through the cooling and lubrication circuit to pass continually, through the clutch actuator circuit when the control valve 48 is in the "engage" position.

We also wish to specifically point out that although the embodiments of our invention described herein contemplate the use of heated compressed air from the inlet end of a gas turbine or turbocharged engine, other sources of heat such as exhaust gas, engine cooling circuits, process gases, etc. may also be used with advantage in practicing our invention.

It is understood, therefore, that the spirit and scope of the appended claims should not be limited to the specific embodiments described and depicted herein.

We claim:

1. In an apparatus having a prime mover including means for providing both a supply of heated compressed air and shaft power selectively couplable through a hydraulically actuated clutch to a driven device, a clutch control system for providing rapid actuation and stable control of the clutch, said clutch control system comprising:

a) clutch actuator means operably connected to said hydraulically actuated clutch for selectively actuating said clutch to couple said prime mover to said driven device, said clutch actuator means defining a control volume of fluid therein; and b) heat exchange means operably connected in a heat transfer relationship between said prime mover and said clutch actuator means for directing a flow of said heated compressed air from said prime mover to said actuator means for heating said control volume of fluid.

2. The apparatus of claim 1 wherein said prime mover is a gas turbine engine including a compressor for supplying said flow of heated compressed air, and a turbine for supplying said shaft power.

3. The apparatus of claim 1 wherein said prime mover is an engine including a turbocharger, with said turbocharger supplying said flow of heated compressed air.

4. The apparatus of claim 1 wherein said clutch actuator means includes:

a clutch control piston movable within a cylinder and operably connected to cause engagement of said clutch when said piston is moved a piston stroke distance by pressurized fluid supplied to said cylinder and applied to said piston, said cylinder and piston stroke distance defining a stroke volume of fluid; and a clutch actuator circuit sequentially including in series flow relationship a fluid reservoir containing a hydraulic fluid, pumping means for creating a pressurized flow of said fluid via a heat exchanger and a control valve to the cylinder of the clutch actuator means for actuating said clutch;

said control valve including means for controlling the application of said pressurized flow to said cylinder in response to control signals received by said control valve, said control valve also defining an internal fluid volume of said control valve;

said internal fluid volume of said control valve in combination with said stroke volume defining said control volume of fluid;

said heat exchanger being operably connected as part of said heat exchange means to receive said flow of heated compressed air from said prime mover and to transfer heat from said flow of heated compressed air to said control volume of fluid.

5. The apparatus of claim 4 said heat exchanger defines an internal heat exchanger volume of said clutch actuator circuit substantially equal to said control volume of fluid.

6. The apparatus of claim 4 wherein said clutch actuator means further includes conduit means operatively connecting said cylinder with said conduit defining a conduit volume of fluid therein, and heat exchanger defines an internal heat exchanger volume of said clutch actuator circuit substantially equal to a sum of said stroke volume plus said internal volume of said control valve plus said conduit volume.

7. The apparatus of claim 4 further including a second fluid circuit connected to the pumping means of the of the clutch actuator circuit in a parallel flow relationship with respect to a clutch control portion of the clutch actuator circuit including the heat exchanger, the control valve, and the cylinder of the clutch actuator circuit;

said second circuit including in a sequential series flow relationship said reservoir, said pumping means, a pressure reducing means, and a low pressure relief valve discharging to said reservoir;

said pressure reducing means operating in conjunction with said low pressure relief valve as sequential pressure drops in a series flow relationship to maintain a low pressure in said second circuit between said pressure reducing means and said low pressure relief valve which is lower than a high pressure supplied by the pumping means to the pressure reducing means in parallel with the clutch control portion of the clutch actuator circuit.

8. The apparatus of claim 7 further including an orifice in said second circuit downstream from said pressure reducing means and disposed in series flow relationship with said low pressure relief valve;

said orifice being configured to provide minimal resistance to fluid flow through the second circuit in comparison to flow resistance imposed by the low pressure relief valve at a predetermined normal operating temperature of the fluid, but providing increasingly significant resistance to fluid flow in comparison to the flow resistance imposed by the low pressure relief valve as fluid temperature is progressively reduced below said normal operating temperature of the fluid flowing in the second circuit;

said orifice thereby operating to progressively increase pressure in both the clutch control circuit and the second circuit as fluid temperature in the second circuit is progressively reduced in such a manner that pressure available to force fluid into the cylinder of the clutch actuator circuit is increased at low fluid temperatures to offset increased resistance to such flow resulting from an increase in viscosity of the fluid at cold temperatures.

9. The apparatus of claim 1 wherein said heat exchange means further include a control valve for shutting off said flow of heated compressed air to said actuator means; and said apparatus includes sensing and control means operably connected between said control volume of fluid and said control valve for sensing a temperature of said control volume of fluid and shutting off said flow of heated compressed air at a predetermined temperature of said control volume of fluid.

10. In an apparatus having a prime mover selectively couplable through a hydraulically actuated clutch to a driven device, and wherein said prime mover includes means for providing a supply of heated compressed air, a clutch control system comprising:

a) clutch actuator means operably connected to said hydraulically actuated clutch for selectively actuating said clutch to couple said prime mover to said driven device, said clutch actuator means defining a control volume of fluid therein;

b) heat exchange means operably connected in a heat transfer relationship between said prime mover and said clutch actuator means for directing a flow of said heated compressed air from said prime mover to said actuator means for heating said control volume of fluid; and c) fluid removal means operably connected between said clutch and said clutch actuator means for removing fluid from said control volume in said clutch actuator means upon disengagement of said clutch.

11. The apparatus of claim 10 wherein said clutch control system further includes a source of pressurized fluid, and said clutch actuator means comprises:

1) actuator means having a cylinder for receipt of a stroke volume of fluid, and including movable wall means operably connected to said clutch in a manner to cause said clutch to engage when said wall is moved by the action thereon of pressurized fluid within said cylinder, and 2) a control valve operably connected between said cylinder and said source of pressurized fluid to receive pressurized fluid from said source of pressurized fluid and deliver said pressurized fluid to said cylinder to act on said wall for engaging said clutch, and alternatively to block fluid from said source of pressurized fluid from reaching said cylinder when said clutch is disengaged; said control valve defining an internal fluid volume thereof; and wherein said control volume of fluid is comprised of said stroke volume of said cylinder, and said internal fluid volume of said cylinder.

12. The apparatus of claim 11 wherein:

said clutch includes a rotatable element mounted for rotation about an axis; said cylinder is disposed within said rotatable element for rotation therewith; and said fluid removal means includes drain hole means defined by said cylinder for removal of fluid from said cylinder by centrifugal pumping action when said clutch is disengaged and said rotatable element is rotating.

13. The apparatus of claim 12 wherein said centrifugal pumping action of said drain hole means further creates a suction within said cylinder for drawing fluid from said internal volume of said control valve, such that said drain hole means removes fluid from both said stroke volume and said internal fluid volume of said control valve, thereby removing fluid from said control volume of said clutch actuator means by said centrifugal pumping action when said clutch is disengaged and said rotatable element is rotating.

* * * * *